(No Model.) 6 Sheets—Sheet 2.
O. P. HURFORD.
BOLT FOR PURIFYING MIDDLINGS, &c.
No. 295,555. Patented Mar. 25, 1884.
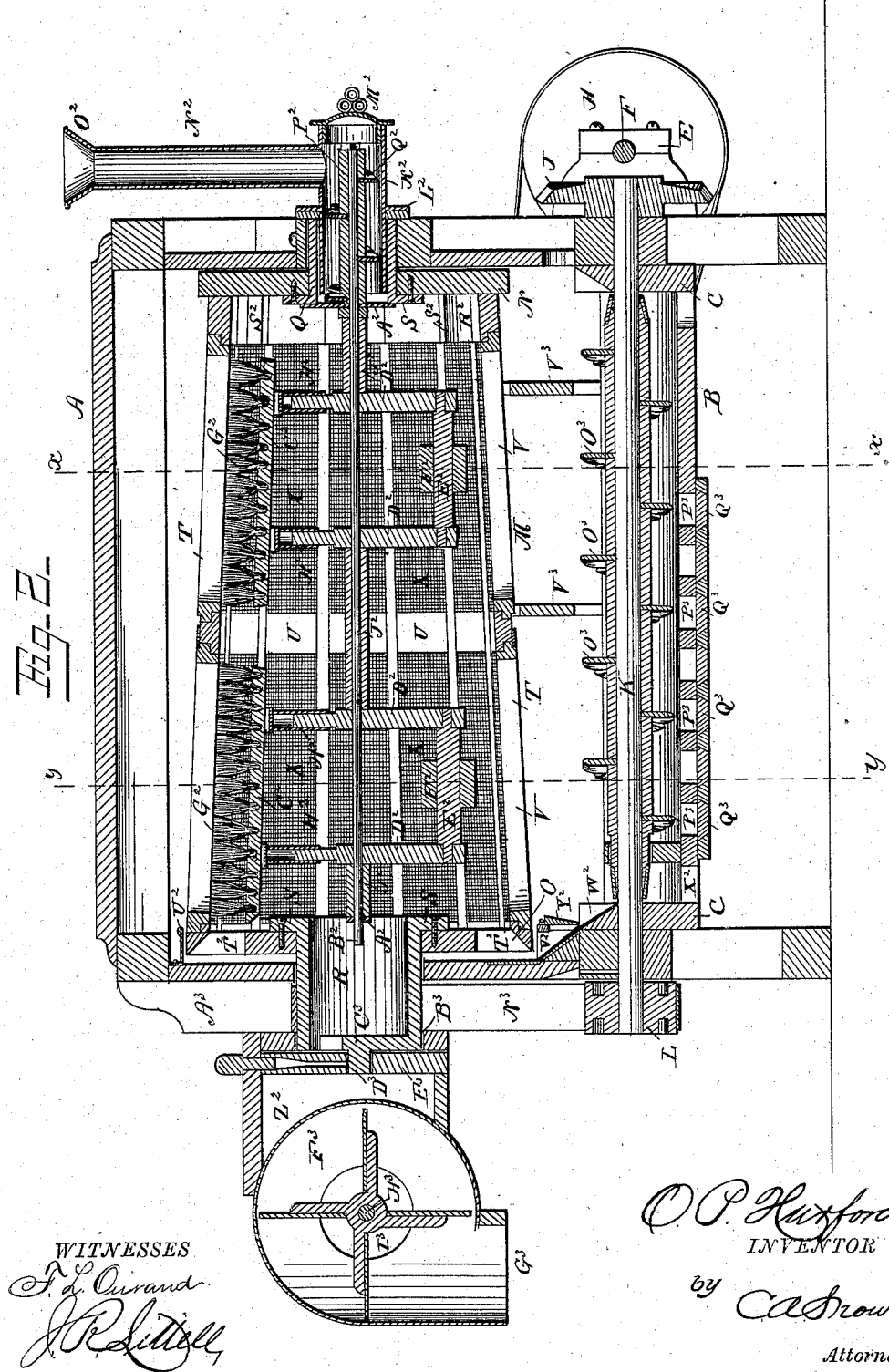

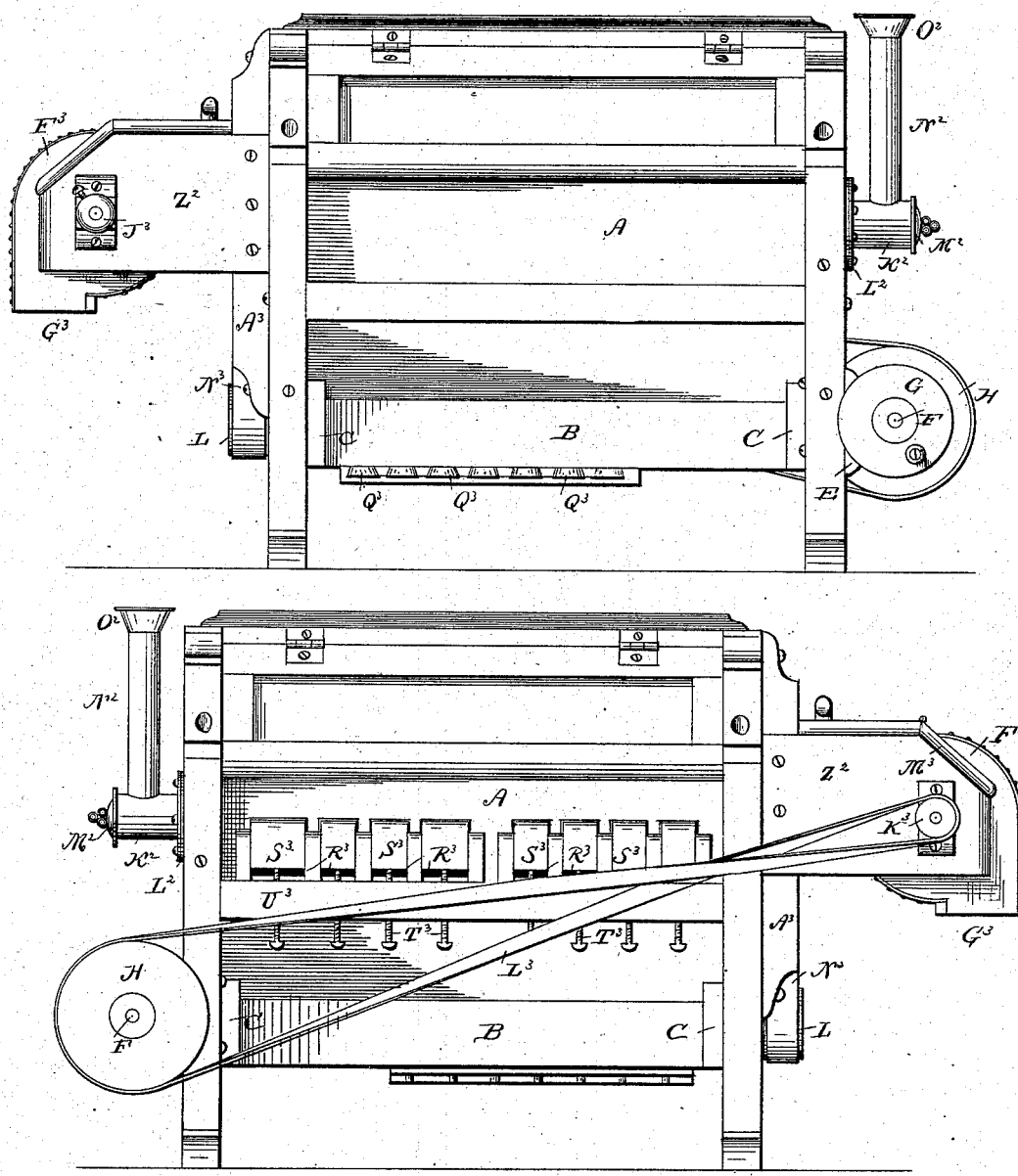

(No Model.)  6 Sheets—Sheet 3.
O. P. HURFORD.
BOLT FOR PURIFYING MIDDLINGS, &c.
No. 295,555.  Patented Mar. 25, 1884.
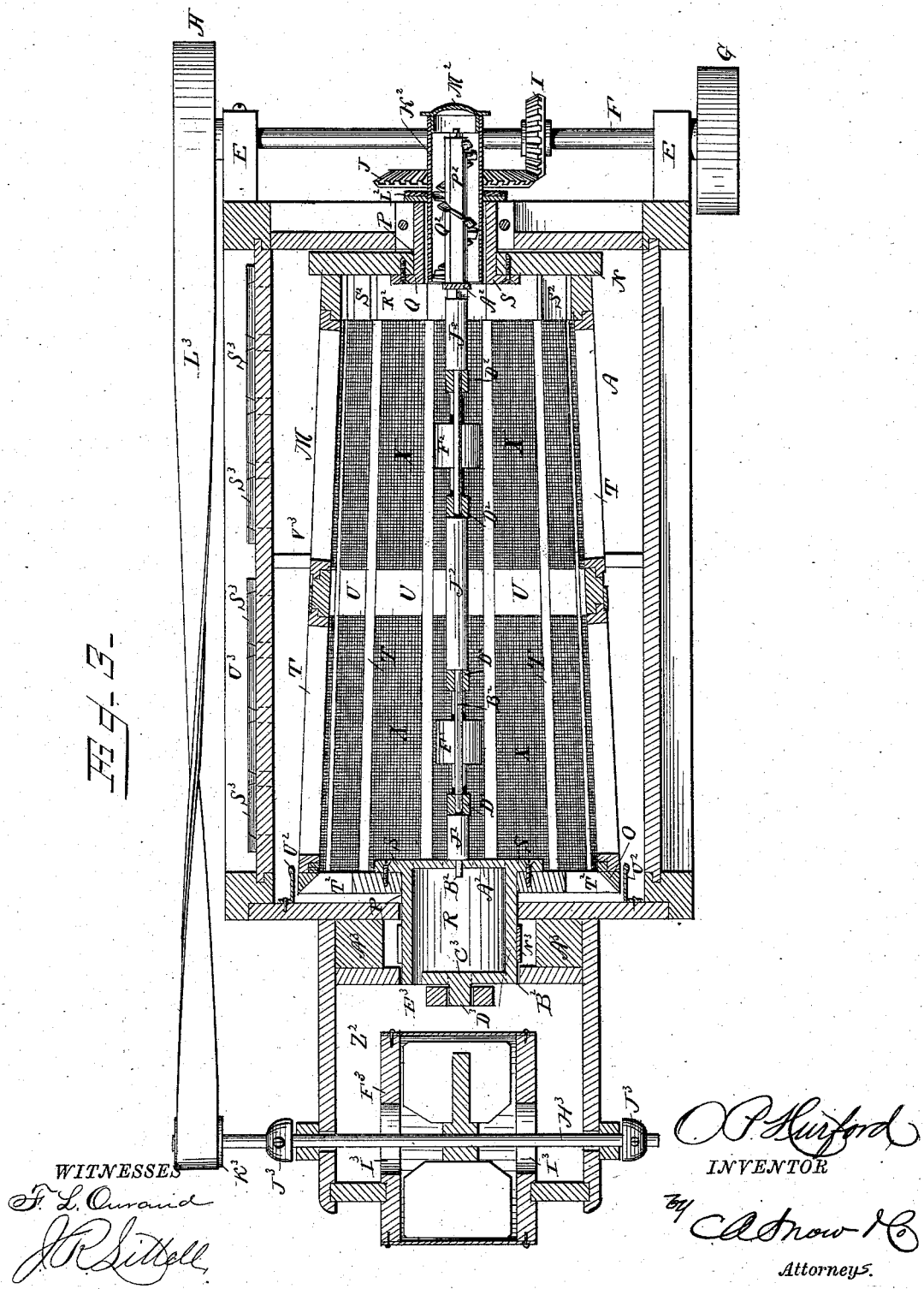
WITNESSES
INVENTOR
Attorneys.

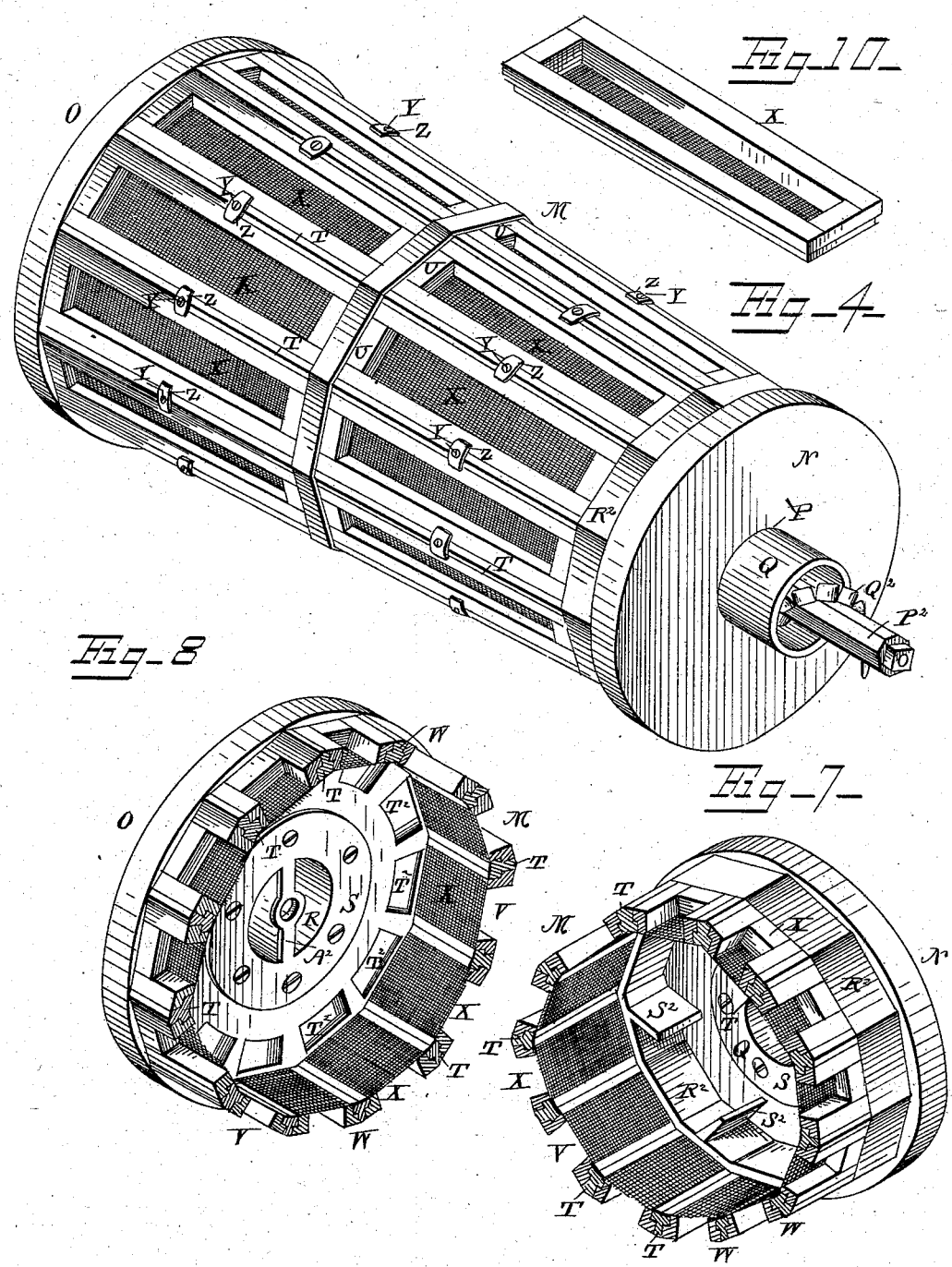

(No Model.) 6 Sheets—Sheet 5.

O. P. HURFORD.
BOLT FOR PURIFYING MIDDLINGS, &c.

No. 295,555. Patented Mar. 25, 1884.

WITNESSES

INVENTOR (No Model.)  
6 Sheets—Sheet 6.

O. P. HURFORD.
BOLT FOR PURIFYING MIDDLINGS, &c.

No. 295,555.  
Patented Mar. 25, 1884.

WITNESSES  
F. L. Durand  
J. R. Littell

INVENTOR  
O. P. Hurford  
By C. A. Snow & Co.  
Attorneys.

N. PETERS, Photo-Lithographer, Washington, D. C.

UNITED STATES PATENT OFFICE.

OLIVER PERRY HURFORD, OF OAKDALE, NEBRASKA.

BOLT FOR PURIFYING MIDDLINGS, &c.

SPECIFICATION forming part of Letters Patent No. 295,555, dated March 25, 1884.

Application filed April 19, 1883. (No model.)

*To all whom it may concern:*

Be it known that I, OLIVER P. HURFORD, a citizen of the United States, residing at Oakdale, in the county of Antelope and State of Nebraska, have invented a new and useful Bolt for Purifying Middlings, &c., of which the following is a specification, reference being had to the accompanying drawings.

This invention relates to rotary bolts for purifying middlings and bolting and rebolting flour; and it consists in certain improvements in the construction of the same, which will be hereinafter fully described, and particularly pointed out in the claims.

Figure 6:
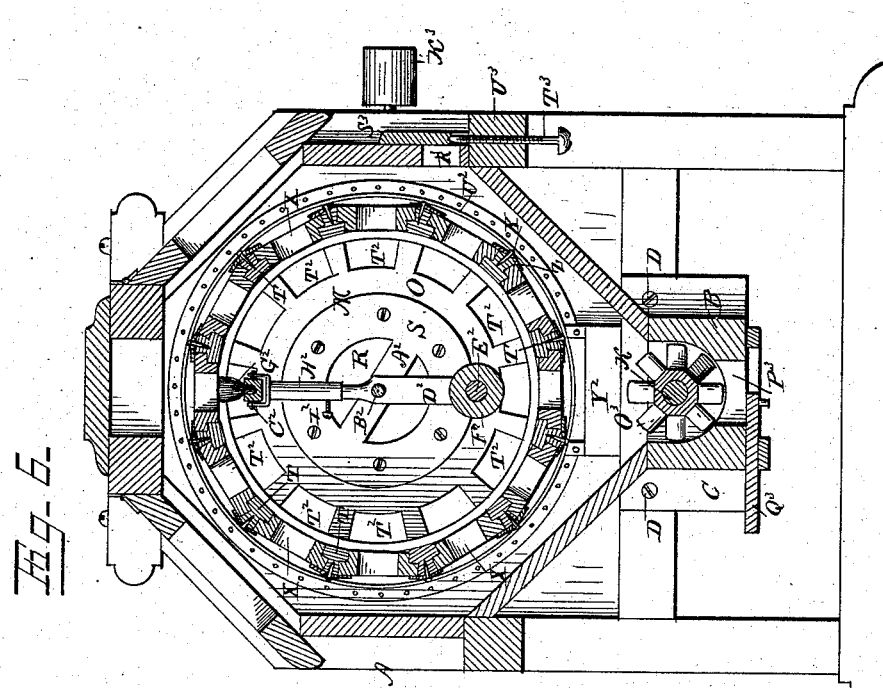
Figure 5:
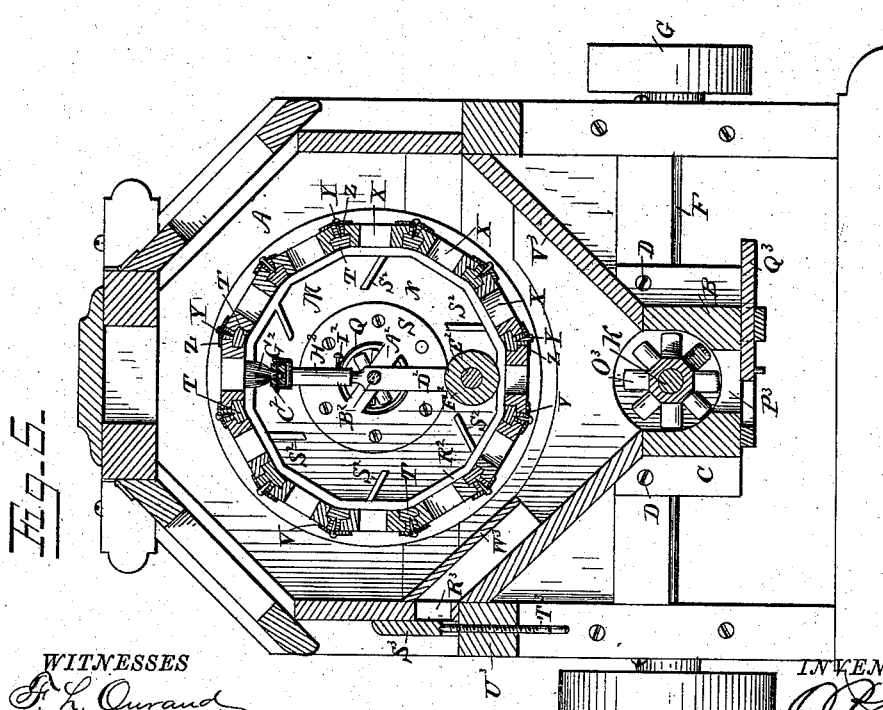
Figure 9:
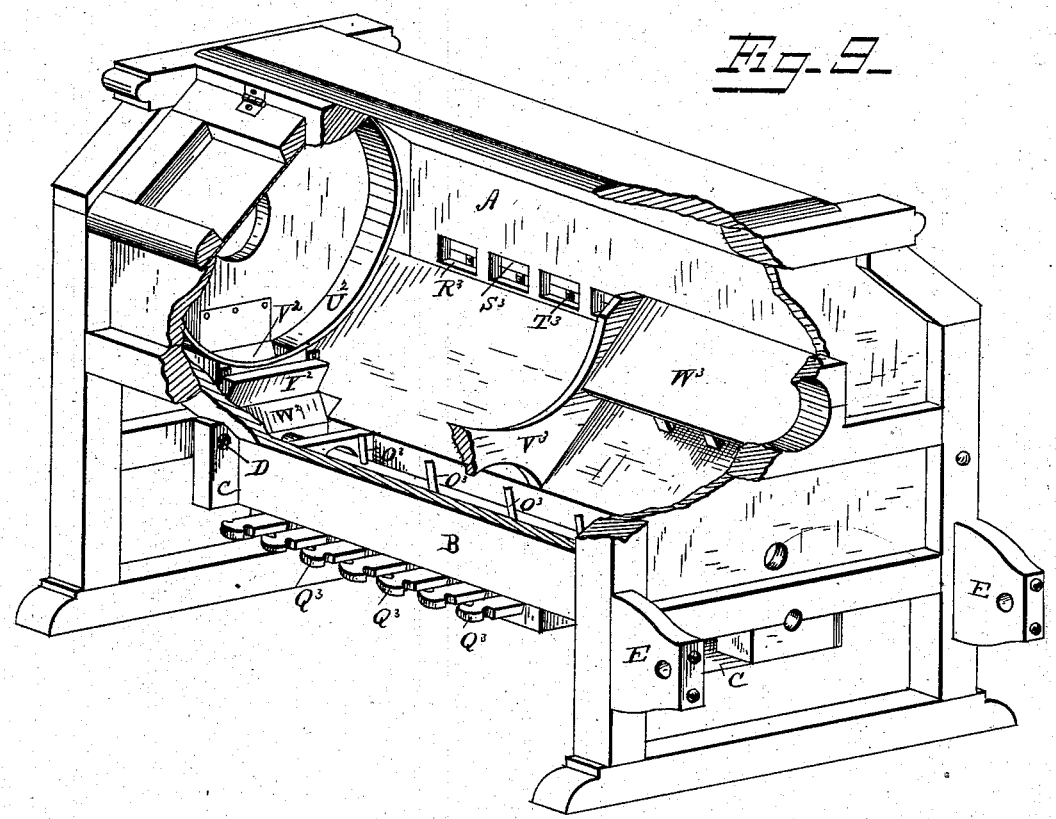
Figure 12:
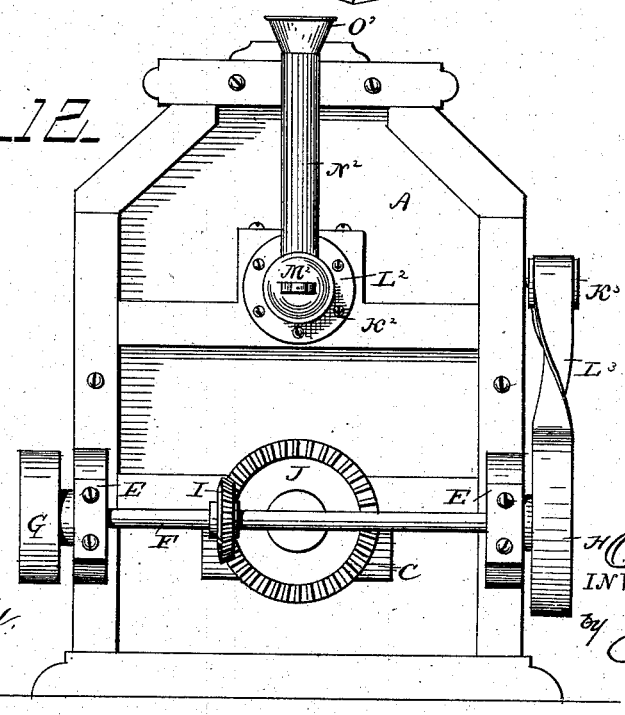

In the drawings hereto annexed, Figure 1 is a side view of the machine complete. Fig. 2 is a longitudinal vertical sectional view. Fig. 3 is a horizontal sectional view. Fig. 4 is a perspective view of the bolting-reel detached. Fig. 5 is a transverse vertical sectional view on the line $x\ x$ in Fig. 2, looking toward the "upper" end of the machine. Fig. 6 is a vertical transverse sectional view on the line $y\ y$ in Fig. 2, looking toward the "lower" end of the machine. Fig. 7 is a detail view, in perspective, of the upper head or end of the reel. Fig. 8 is a detail view, in perspective, of the lower head of the reel. Fig. 9 is a perspective view of the bolting-chest, parts of the same having been broken away for the purpose of showing the construction more clearly. Fig. 10 is a detail view, in perspective, of one of the sections or frames forming the panels of the bolting-reel. Fig. 11 is a view of the side of the machine opposite to that shown in Fig. 1; and Fig. 12 is an end view, showing the upper end of the same.

The same letters refer to the same parts in all the figures.

A in the drawings designates the casing or bolting-chest, which consists, mainly, of a suitably-constructed rectangular box, made polygonal, so as to correspond somewhat with the formation of the reel, and provided at its ends with bearings for the journals of the said reel, of which further mention will hereinafter be made. The bottom of the casing is formed by the conveyer-trough B, the ends of which are provided with flanges C C to receive screws D, or other means for connecting the said trough detachably to the ends of the casing, as shown in the drawings. The upper end of the casing (the end thus designated is the end at which the middlings, chop, or flour enter the machine, in contradistinction to the exit end, which I term the "lower" end) is provided with brackets E E, forming bearings for the transverse main shaft F, one end of which is provided with a band-wheel, G, or other suitable means for receiving motion from such power as may be employed for driving the machine. The rear end of the main shaft has a band-wheel, H, and about centrally upon the main shaft is keyed a pinion, I, meshing with a gear-wheel, J, upon the upper end of the conveyer-shaft K, which is journaled in the ends of the casing, it being located longitudinally in the conveyer-trough. The lower end of the conveyer-shaft is equipped with a band-wheel, L.

M designates the reel, the frame of which is polygonal in cross-section and tapering from end to end, the lower end being largest. By this construction it will be seen that when the reel is hung with its axis in a horizontal plane its lower side will always be inclined toward the lower end, in which direction the contents of the reel will thus tend to travel. The heads or ends of the reel N and O are provided with centrally-located openings P, in which are fitted tubular gudgeons Q and R, the inner ends of which are provided with annular flanges S, to receive the screws or bolts by which the gudgeons are secured to the heads of the reel. The heads N and O are connected by longitudinal frame-bars T, thus forming the sides or panels, each of which is subdivided by cross-pieces U into two or more spaces or compartments, V. The margins of these compartments, which are composed of the reel-heads, frame-bars, and cross-pieces, are rabbeted, as at W, to receive the correspondingly-rabbeted frames X, which, when placed in position, will thus be found to have their inner sides flush with the inner sides of the frame-bars and cross-pieces, so that the entire inside of the reel shall present an even and unbroken surface. This is an item of considerable importance, for reasons which will be hereinafter more fully explained. The bolting-cloth is secured in any suitable manner upon the inner sides of the frames X. It will be seen that by this construction of the reel only small pieces of bolting-cloth are required, so that if any one piece should be broken or injured it may be replaced speedily and at a trifling expense. The frames X may be secured in position by means of screws Y, entering the frame-bars T between the said panels, and having plates or washers Z, which extend over the sides of the frames, which are thereby held securely in their respective positions. By removing the screws at the sides, any one of the frames may be speedily and conveniently removed when occasion shall require. The inner ends of the tubular gudgeons of the reel are provided with cross-pieces $A^2$, serving to support a central longitudinal shaft, $B^2$, one end of which extends out through the gudgeon Q at the upper head of the reel. Upon this shaft are hung a series of brushes, $C^2$, each of which may consist of a pair of arms, $D^2$, journaled upon the shaft, and having their lower ends connected by a cross-piece, $E^2$, upon which a weight, $F^2$, is arranged for the purpose of holding the brushes in a vertical or upright position. The brushes, which are denoted by letters $G^2$, are provided with sockets $H^2$, having set-screws $I^2$, by which they may be adjusted vertically upon the arms $D^2$. The devices $C^2$ may be properly spaced upon the shaft $B^2$ by means of sleeves or washers $J^2$. By this construction it will be understood that when the reel revolves the brushes will swing freely upon the shaft and brush the upper part of the inside of the reel, which is thus prevented from clogging. The brushes may be vertically adjusted, as stated, so as to bear against the inside of the reel with any desired degree of pressure, and when worn they may be easily and quickly raised and readjusted, so as to operate successfully until completely worn out.

$K^2$ is the feed-tube, which is provided with a flange, $L^2$, by means of which it is secured to the casing at the upper end of the latter. The inner end of said feed-tube is extended into the gudgeon Q of the reel and through said gudgeon. Its outer end has a detachable cap or cover, $M^2$. The part of the feed-tube which is outside the casing is provided with an upwardly-extending supply-tube, $N^2$, having a hopper, $O^2$, at its upper end. Upon the upper end of the shaft $B^2$, which extends, as shown, out into the feed-tube and under the supply-tube, is secured a sleeve, $P^2$, having a spiral conveyer rib or flange, $Q^2$. It will be seen that when the reel revolves this flange will serve to force or feed the middlings, chop, or flour which enters the feed-tube through the supply-tube into the reel, with which the said spiral feed-flange revolves, it being mounted upon the shaft $B^2$, which is firmly connected to the heads of the reel, in the manner described. The upper head, N, of the reel is provided on its inner side with an annular flange, $R^2$, having on its inner side a series of radial wings or "scatterers," $S^2$. The function of these is to scatter and disintegrate the chop, &c., as it enters the reel, thus causing the air-blast (which will be hereinafter described) to separate the light and worthless parts and carry them in a direct line out through the reel and to the dust-spout. The lower end or head of the reel is provided near its edge with a circumferential series of openings, $T^2 T^2$, the outer sides of which are beveled down to the outer edge of the reel-head, as shown. The said lower reel-head is fitted within an annular ring or flange, $U^2$, upon the inner side of the lower end of the casing A, which flange is provided at its lower side with an opening, $V^2$, under which is arranged an inclined spout, $W^2$, leading to an opening, $X^2$, in the bottom of the conveyer-trough, through which the offal may pass. The spout $W^2$ is equipped with a hinged valve, $Y^2$, which, while it permits the escape of the offal, will prevent the air-current from entering the lower end of the reel through this channel. The ring or annular flange $U^2$, which encircles the lower head of the reel, serves a like purpose.

$Z^2$ is a suitable box or casing mounted upon vertical bars or brackets $A^3 A^3$, by which it is secured upon the lower end of the casing or chest A. The casing $Z^2$ has an opening, $B^3$, to receive the projecting end of the tubular gudgeon R of the reel. The outer end of the said gudgeon is provided with a spider, $C^3$, having a journal, $D^3$, which is mounted in a cross-bar, $E^3$, secured across the opening $B^3$ upon the inside of the casing $Z^2$. In this manner a firm and steady bearing for the lower end of the reel is secured.

Within the casing $Z^2$ is arranged the fan-case $F^3$, which terminates in the dust-spout $G^3$. The shaft $H^3$, which carries the fan, extends through openings $I^3$ in the sides of the fan-case, and is journaled in the sides of the casing $Z^2$. Suitable collars, $J^3$, are provided, which serve to hold the fan-shaft in position in its bearings. The rear end of the fan-shaft carries a pulley, $K^3$, which is connected by a belt, $L^3$, with the band-wheel H upon the main shaft. Motion is in this manner conveyed to the fan when the machine is operated.

The casing $Z^2$ may be provided with a hinged lid, $M^3$, which affords access to its interior.

Motion is imparted to the reel by a belt or band, $N^3$, connecting the band-wheel L upon the lower end of the conveyer-shaft with the tubular gudgeon R upon the lower end of the reel, which said gudgeon performs the additional function of a band-wheel. Working-room for the said belt or band is afforded between the vertical bars or brackets $A^3 A^3$, which serve to secure the casing $Z^2$ upon the end of the bolting-chest.

The conveyer is of the ordinary well-known construction, and consists, mainly, of a series of blades of suitable size and shape, arranged in spiral order upon the conveyer-shaft K, said blades, which are denoted by letters $O^3$, forming a spiral flange, which, when the machine is in operation, serves to force the contents of the trough B toward the upper end of the latter. The bottom of the conveyer-trough is provided with openings $P^3$, having slides $Q^3$, for the escape of the contents.

The rear side of the bolting-chest is provided with a series of vent-openings, $R^3 R^3$, having slides $S^3$, for regulating the draft or blast. The said slides are operated by screws T³, bearing against their under sides, and working in a rail or flange, U³, upon the rear side of the chest or casing. The chest or casing is provided with several vertical transverse partitions, V³, fitting as closely as possible against the under side of the reel, for the purpose of preventing the draft or blast from tending toward the lower end of the latter. An inclined board or deflector, W³, is arranged to cover the vents R³ at the upper end of the casing, for the purpose of deflecting the draft or blast from said openings against the under side of the reel.

From the foregoing description, taken in connection with the drawings hereto annexed, the operation and advantages of my invention will be readily understood.

The reel being conical or bell-shaped, as shown, it may be hung in a horizontal plane, and is therefore not liable to sag or run hard, while its contents will at the same time tend toward its lower end during operation. The inside of the reel is, by the construction described, smooth and even, and thus susceptible of being continuously cleaned by the brushes. A supporting-shaft for the reel-body is entirely dispensed with. The chop, &c., enters through the tubular gudgeon at the upper end of the reel, is disintegrated by the scatterers S², and passes downwardly through the reel, which revolves at the usual speed. The draft or blast created by the suction-fan at the lower end of the reel carries the fluff or light offal directly through the reel and to the dust-spout. The air-draft which enters through the vents R³ is mainly deflected toward the under side of the reel, and is prevented from entering the lower end of the reel by the ring or band U² and valve Y², herein described. The offal escapes through the said valve, and the bolted flour through the conveyer-trough, in the manner described.

The construction of the whole is simple and convenient and the operation effective.

I claim as my invention and desire to secure by Letters Patent of the United States—

1. In a rotary bolt, the combination of a reel mounted upon tubular gudgeons, cross-bars at the inner ends of said gudgeons, a shaft mounted securely in said cross-bars, and brushes mounted pivotally upon said shaft, said brushes consisting, essentially, of frames weighted at their lower ends and having vertically-adjustable brushes at their upper ends, substantially as and for the purpose set forth.

2. In a rotary bolt, the combination of the reel mounted upon tubular gudgeons, means for feeding the reel through the gudgeon at the upper end of the same, radial wings or scatterers upon the inside of the reel at the upper end of the same, and a suction-fan arranged outside and connected with the gudgeon at the lower end of the reel, as set forth.

3. The combination of the bolting-chest, the cylindrical ring or band upon the inner side of the lower end of the same, and the reel, the lower end of which is fitted within the said ring or band, substantially as and for the purpose set forth.

4. The combination of the bolting-chest, the reel hung in the same upon tubular gudgeons, the openings in the lower head of the reel beveled down to the edge of the latter, the ring or band upon the inside of the lower end of the chest surrounding the lower head of the reel, the slanting chute at the lower end of said ring or band, and the drop-valve, all arranged and operating substantially as set forth.

5. The combination of the bolting-chest, the reel, tubular gudgeons for said reel, a spider formed at the outer end of the lower gudgeon and having a spindle or journal, a box or casing secured at the lower end of the chest and having an opening into which the lower gudgeon of the reel extends, and a cross-bar upon the inner side of said opening forming a bearing for the spindle upon the lower gudgeon of the reel, as set forth.

6. The combination of the bolting-chest, the reel, tubular gudgeons for said reel, means for feeding the reel through the gudgeon at its upper end, radial wings or scatterers upon the inside of the reel at its upper end, a box or casing secured on vertical bars or brackets upon the lower end of the chest and having an opening into which the gudgeon at the lower end of the reel projects, the fan-case arranged in said box or casing, and the fan journaled transversely in the sides of the box or casing, as set forth.

7. The combination of the chest, the vents, the transverse partitions, the deflector, the reel hung upon tubular gudgeons, openings in the lower head of the reel, a band encircling the said lower end, a chute and a valve, as described, means for feeding the reel through the gudgeon at its upper end, and a suction-fan connected with the tubular gudgeon at the lower end of the reel, substantially as set forth.

8. The combination of the bolting-chest, the conveyer-shaft arranged longitudinally in the trough at the bottom of said chest, the reel mounted in the chest upon tubular gudgeons, the lower one of which extends through the casing and is formed with a spindle, a box mounted on vertical bars or brackets at the lower end of the chest and having a bearing for said spindle, a band-wheel on the lower end of the conveyer-shaft, a belt connecting the said band-wheel with the lower gudgeon, and suitable operating mechanism, all arranged and operating substantially as set forth.

In testimony that I claim the foregoing as my own I have hereto affixed my signature in presence of two witnesses.

OLIVER PERRY HURFORD.

Witnesses:
D. A. HOLMES,
H. E. KRYGER.